Sept. 17, 1940.   J. W. MYERS   2,215,404
TIME CONTROL MECHANISM FOR FLASHING ELECTRIC RANGE UNITS OR THE LIKE
Filed Aug. 25, 1938   4 Sheets-Sheet 1

Inventor:—
Joseph W. Myers
By his Attorneys
Howson & Howson

Sept. 17, 1940. J. W. MYERS 2,215,404
TIME CONTROL MECHANISM FOR FLASHING ELECTRIC RANGE UNITS OR THE LIKE
Filed Aug. 25, 1938 4 Sheets-Sheet 2

Inventor:-
Joseph W. Myers
by his Attorneys
Howson & Howson

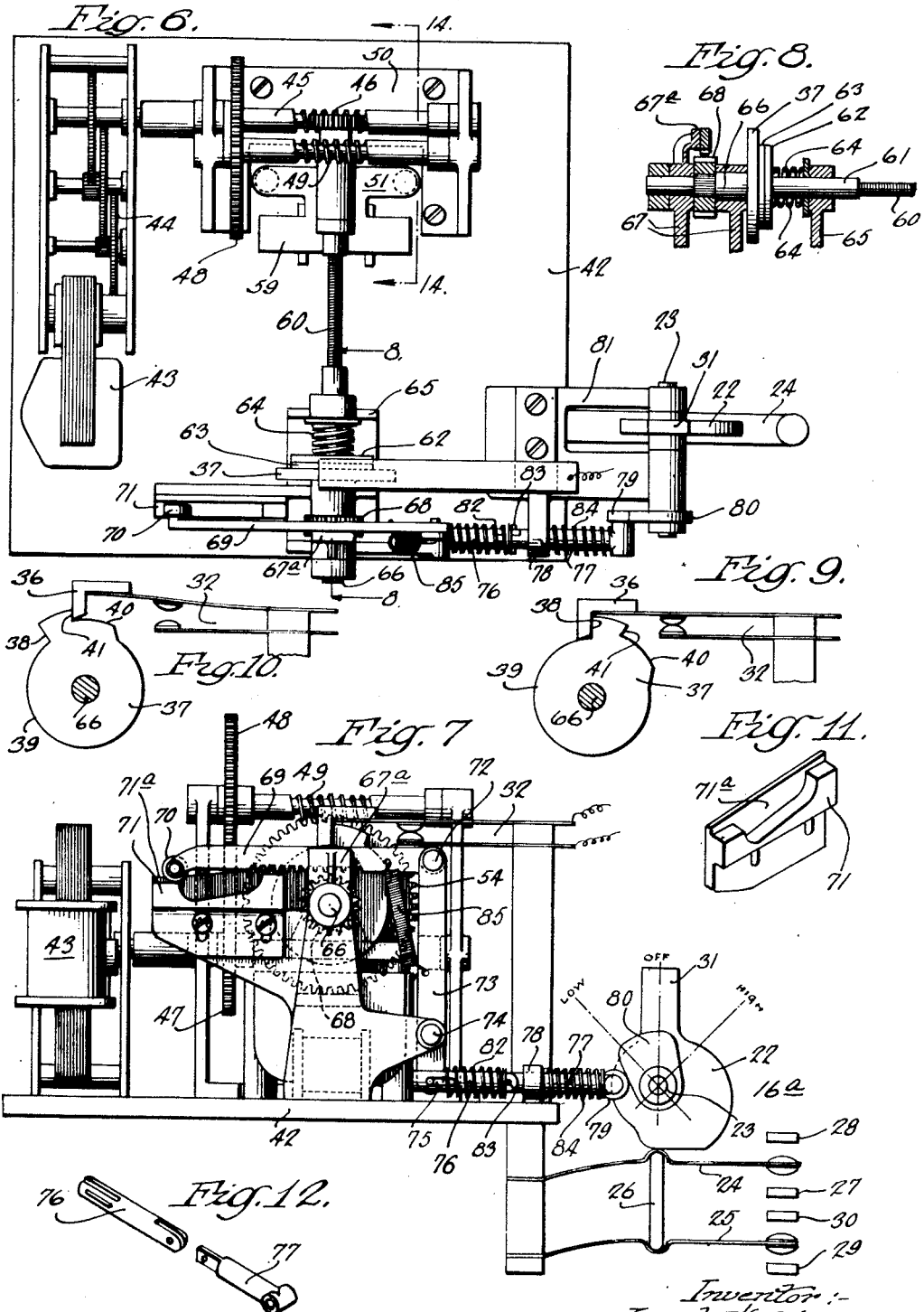
Inventor:
Joseph W. Myers
By his Attorneys
Howson & Howson

Sept. 17, 1940.   J. W. MYERS   2,215,404
TIME CONTROL MECHANISM FOR FLASHING ELECTRIC RANGE UNITS OR THE LIKE
Filed Aug. 25, 1938    4 Sheets-Sheet 4
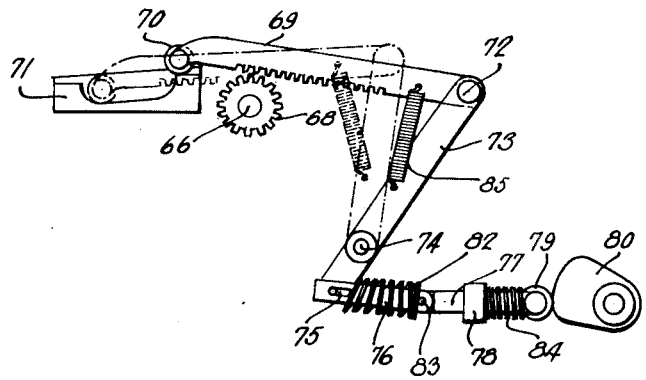
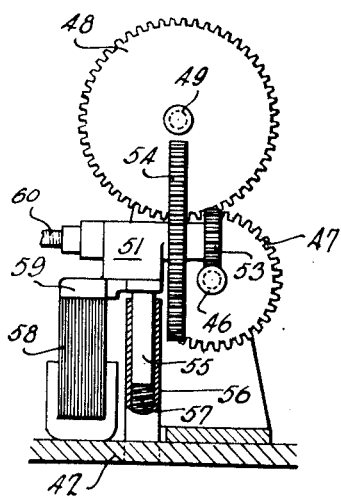
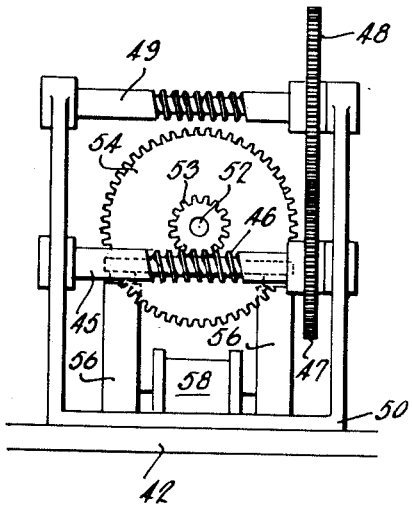
Inventor:-
Joseph W. Myers
by his Attorneys
Howson & Howson Patented Sept. 17, 1940

2,215,404

UNITED STATES PATENT OFFICE

2,215,404

TIME CONTROL MECHANISM FOR FLASHING ELECTRIC RANGE UNITS OR THE LIKE

Joseph W. Myers, Philadelphia, Pa., assignor to Proctor & Schwartz, Incorporated, Philadelphia, Pa., a corporation of Pennsylvania Application August 25, 1938, Serial No. 226,811

16 Claims. (Cl. 219—20)

This invention relates to electric range cooking units and the like, and more particularly to novel control means for effecting rapid heating of such units to a desired temperature level and for imparting to such units a high degree of flexibility of control and operation.

The use of electric ranges and other electrical devices employing surface cooking units or plates has been limited or retarded in the past by the fact that such devices require appreciable time to attain their normal operating temperature and heat output at whatever level has been selected, and in this respect are not comparable in operation to gas ranges. It is well known that electric ranges have certain definite advantages over the gas ranges, but such advantages have heretofore been generally outweighed by the inherent inability of electric range units to rise rapidly to the several selectable operating temperatures.. Moreover, electrical devices of this type which heretofore have been proposed or used have not had the high degree of flexibility of operation that obtains in the gas range, and this is a further reason why gas ranges have been frequently employed in the past in preference to electric ranges.

It has been proposed heretofore to temporarily overload, or increase the energization of, an electrical surface cooking plate unit by temporarily lowering the resistance of the unit to the supply voltage, and it has been proposed to employ a thermostat directly associated with the plate so as to be effected by the temperature thereof and arranged to restore the resistance of the heating unit to its normal value when the device has arrived at its normal operating temperature. It has also been proposed to decrease the resistance of the heating unit either by providing a normally short-circuited portion of the unit which is rendered effective by the thermostat when the unit has reached its normal operating temperature, or by providing a multi-section heating unit and initially connecting the sections in parallel relation and arranging the thermostat to connect them in series relation when the unit has reached its normal operating temperature. While these proposals have been improvements over the ordinary range unit, they have fallen short of providing a practical and commercially satisfactory range unit or surface cooking plate.

A thermostat necessarily involves a moving part or parts and for this reason it requires servicing from time to time. If it is located where it is subject to accumulation of food substances, it is apt to be deleteriously affected. A striking example of this is found in some bread toasters in which the thermostatic switch is not protected against accumulation of bread particles and such particles frequently become lodged between the switch contacts, preventing them from closing. The most convenient place to locate a thermostat for controlling a range unit or cooking plate is on the bottom surface of the plate, but experience has shown that it is difficult in practice to so locate a sufficiently sensitive and rugged thermostat and, at the same time have it accessible for servicing and inspection and properly protected from inevitable spillage of food substances.

Furthermore, it is difficult to manufacture an accurate high temperature thermostat which will operate certainly at the highest safe temperature to which it is desired to heat a range unit rapidly. Obviously, it is important in this instance that the thermostat operate certainly at the desired temperature, since a delay of a few seconds occasioned by the failure of some moving part to operate at the proper time might well prove destructive to the heating unit.

Thus, it is manifest that a control device, such as a thermostat, which depends for its accuracy of control upon a sensitive movable part or parts, has serious limitations in practical use, at least so far as concerns the control of rapid heating of a range unit.

The principal object of the present invention is to provide a control mechanism for effecting rapid heating of an electric range unit by over-energizing the unit temporarily under control of novel timing means. The rapid heating of the unit may be aptly termed "flashing" of the unit to the desired temperature. The timing means controls the period of the flashing operation.

Another object of the invention is to provide a novel control mechanism for this purpose which embodies an electronic timer for controlling the flashing operation.

A further object of the invention is to provide a novel mechanism of this character employing a motor-driven mechanical timer for controlling the flashing operation.

Still another object of the invention is to provide a timer for the stated purpose wherein a timing element is energized through a timing cycle at a rate comparable to the flash heating rate of the heating unit, to thus control the flashing operation, and the said element is operated through a return cycle at a rate comparable to the cooling rate of the unit when the unit is deenergized. Thus the timing element is caused to substantially "track" with the temperature of the heating unit and is enabled to govern the flashing of the unit according to the condition of the unit when it is flashed.

Other objects and features of the invention will appear hereinafter.

In the accompanying drawings:

Fig. 6 is a plan view of the timer;

Fig. 7 is a front elevational view of the timer;

Fig. 8 is a detail sectional view taken along line 8—8 of Fig. 6;

Figs. 9 and 10 are detail views of the timing cam and the associated switch;

Fig. 11 is a perspective view of the guide cam;

Fig. 12 is a perspective view of certain link parts;

Fig. 13 is a detail view of the linkage mechanism;

Fig. 14 is a sectional view taken along line 14—14 of Fig. 6; and

Fig. 15 is a rear elevational view of the timer.

Figure 1:
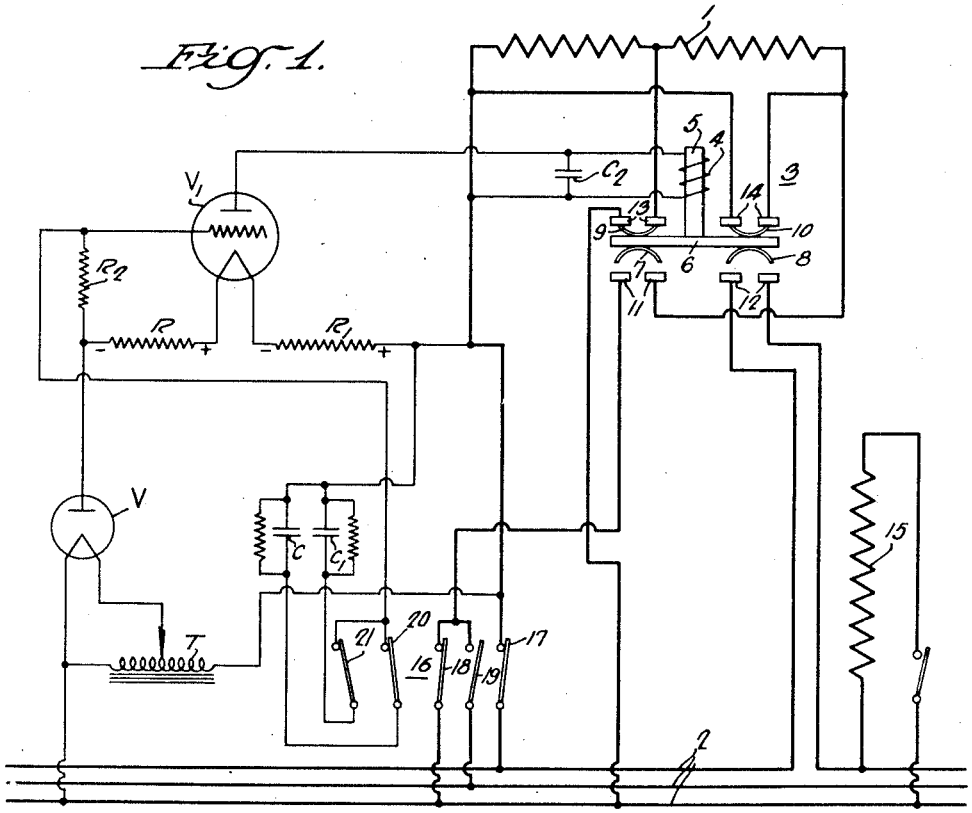
Fig. 1 is a diagrammatic illustration of one form of the control mechanism employing an electronic timing device.

Referring first to Fig. 1, there is shown a heating unit 1 comprising a plurality of sections, two sections being employed in the specific device illustrated. The heating unit is energized from a three-wire supply line 2 which supplies different operating voltages as will be well understood.

For example, the voltage across two adjacent conductors of the supply line may be 115 volts, while the voltage across the two outer conductors may be 230 volts. A switching device or contactor 3 is adapted to change the connections of the heating unit sections from normal series relation to parallel relation, in order to increase the energization of the heating unit, or, in other words, to flash the heating unit as above mentioned. While it is preferred to employ a multi-section heating unit and to flash the unit by changing the connections of the sections, the invention is not limited thereto and any desired arrangement may be employed for the purpose in view. The contactor 3 is electromagnetically operated and comprises an energizing winding 4 and an associated armature 5 having a magnetic core associated with the winding. The cross-bar 6 of the armature may be formed of insulating material and carries lower contact bridges 7 and 8 and upper contact bridges 9 and 10. The contact bridges 7 and 8 are adapted to engage stationary contacts 11 and 12, respectively, while the upper contact bridges are adapted to engage stationary contacts 13 and 14, respectively.

Normally, the armature of the contactor 3 is in its lower position so that the contacts 11 and 12 are closed but when the contactor is energized, its armature moves to the upper or "flash" position shown, thus opening contacts 11 and 12 and closing contacts 13 and 14. It will be noted that contacts 12 are included serially in the uppermost supply conductor and, when these contacts are opened during the flashing operation, the consequent opening of the uppermost supply conductor deenergizes any subsequent heating unit or load device connected to the uppermost conductor, as represented by the heating unit 15. In other words, during the flashing of heating unit 1, any subsequent load connected to the uppermost conductors is dropped temporarily to prevent overloading of the system. This feature is disclosed more fully and is broadly claimed in copending application Serial No. 194,498, filed March 7, 1938.

Figure 2:
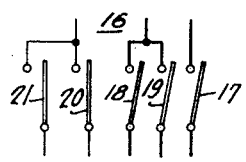
Figs. 2 and 3 are illustrations of different positions of the control switch of Fig. 1.
Figure 3:
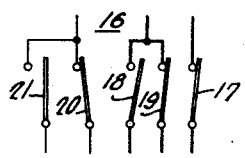

The control mechanism for heating unit 1 is controlled by the manually-operable three-position switch 16 which may conveniently comprise a plurality of resilient contact fingers movable to the positions shown in Figs. 1, 2 and 3 when the switch is actuated to its "high," "off" and "low" positions, respectively. The switch arms or fingers may be actuated by cams mounted upon a common rotatable shaft in accordance with common practice, the cams being designed to move the contact arms to the positions shown when the shaft is rotated to different angular positions. The high and low switch positions control the flashing of the heating unit 1 to different temperature levels and also control the operation of the heating unit at those temperature levels.

When the switch is in the high position shown in Fig. 1, for operation of the heating unit 1 at its normal high temperature, and when the contactor 3 is in its normal position, the heating unit sections are connected in series relation across the high voltage supply conductors through a circuit which may be readily traced from the uppermost supply conductor, through contact arm 17, the heating unit sections in series, closed contacts 11, and contact arm 18 to the lowermost supply conductor. When the contactor moves to its flash position, as shown, the heating unit sections are connected in parallel relation across the high voltage supply conductors through a circuit which may be traced from the uppermost supply conductor, through contact arm 17, through two parallel branch circuits, one of which includes the left-hand section of unit 1, while the other includes the closed contacts 14 and the right-hand heating unit section, and thence through closed contacts 13 to the lowermost supply conductor.

As may be seen from Fig. 3, when the switch 16 is in its low position during normal operation of the heating unit, the heating unit sections are connected in series relation across the two upper low voltage conductors by virtue of the opening of contact arm 18 and the closing of contact arm 19. During the "flash to low" operation, however, the heating unit sections are connected in parallel relation across the high voltage conductors, as in the case of the "flash to high" operation above described.

Thus, during either low or high flash operation of unit 1, the heating unit sections are connected in parallel relation across the high voltage supply conductors; during normal high operation the sections are connected in series relation across the high voltage conductors; and during normal low operation, the heating unit sections are connected in series across the low voltage conductors.

The flashing of heating unit 1 to the different temperature levels is controlled in the system of Fig. 1 by means of an electronic timer which, in turn, is controlled by the manually-operable switch 16. This device comprises a diode rectifier tube V which is energized by the auto-transformer T connected across the high voltage supply conductors through contact arm 17, as clearly illustrated. While any suitable type of transformer may be used, the auto-transformer is preferably employed because of its simplicity of construction. The filament or cathode of the rectifier tube V is connected across a portion of the transformer as illustrated. The remainder of the transformer winding is connected between the cathode and anode of tube V through resistors R and $R_1$ and through the cathode or filament of triode tube $V_1$. It will be apparent that the tube V constitutes a half-wave rectifier and, during alternate half cycles of the supply voltage, the anode of tube V is charged positively with respect to its cathode causing uni-directional current to flow through the resistors R and $R_1$ and through the filament or cathode of tube $V_1$. The resistor $R_1$ is connected through winding 4 to the anode of tube $V_1$ so that the uni-directional voltage across the resistor is applied between the cathode and anode of tube $V_1$. Since the voltage across resistor $R_1$ has the polarity indicated, the anode of tube $V_1$ is charged positively with respect to the cathode, causing plate current flow in the output circuit of tube $V_1$ when the cathode of the tube reaches its electron emission temperature. The resistor R is connected between the cathode and grid of tube $V_1$ through the relatively high charging resistor $R_2$ for the condensers C and $C_1$. When the contacts 20 and 21 of switch 16 are in the positions shown in Fig. 1 for "high" operation, the condensers C and $C_1$ are connected in parallel with one another in circuit with resistor $R_2$ and the cathode of tube V, but when the contacts 20 and 21 are in the positions of Fig. 3 for "low" operation, only the condenser C is included in the said circuit. When the switch 16 is in the "off" position, as shown in Fig. 2, the device is deenergized.

Considering the operation of the device and assuming first that the switch 16 has been thrown from its "off" position to the "high" position shown in Fig. 1, the energization of the tube V initiates the rectifying action above mentioned which, in turn, energizes tube $V_1$ and causes plate current flow therein. The plate current of tube $V_1$ flowing through winding 4 energizes contactor 3, moving its armature to the flash position shown. The purpose of condenser $C_2$ is to reduce fluctuating components of the plate current, thus stabilizing the operation and preventing chatter of the contactor. The energization of contactor 3 connects the sections of heating unit 1 in parallel relation, thus increasing the energization of the heating unit and causing rapid heating thereof, as above described.

The rectifying action of tube V also sets up across resistor R a voltage having the polarity indicated. The voltages across R and $R_1$ are applied in series across condensers C and $C_1$ through the charging resistor $R_2$, causing the condensers to charge at a relatively slow rate. It will be apparent that the rate of charge of condensers will be determined by the values of $R_2$, C and $C_1$ which constitute a time-delay circuit. The timing action of this circuit controls the time duration of the flashing operation. In this device, the condensers C and $C_1$ constitute the timing elements and the rate of charge of the condensers is made comparable to the rate of heating of the unit 1 by the flash currents supplied thereto. In other words, the condensers are energized through a timing cycle at a rate comparable to the heating rate of unit 1. Due to the high resistance $R_2$ leading to the tube grid from the negative end of resistor R, the grid of the tube is not immediately charged to a plate current blocking potential since condensers C and $C_1$ tend to absorb the electrons as fast as they leak through resistor $R_2$ and are collected on the grid from the tube cathode. The condensers C and $C_1$, however, will eventually become charged to a point where the negative charge on the grid will build up to such a point that the plate current of the tube is substantially cut-off, deenergizing the contactor 3 and restoring the normal series connection of the sections of heating unit 1. During subsequent operation, the tube $V_1$ is maintained in its blocked condition.

When the switch 16 is thrown to its "off" position as shown in Fig. 2, the tubes V and $V_1$ are deenergized and the condensers are slowly discharged at a rate comparable to the cooling rate of unit 1. If necessary, the rate of discharge of the condensers may be made of the proper order by employing discharge resistances shunting the condensers, as illustrated, and having proper values. Thus when the unit 1 is deenergized, the timing elements (condensers C and $C_1$) are operated through a return cycle at a rate comparable to the cooling rate of unit 1.

If the switch 16 is thrown from its "off" position to its low position, the operation described above takes place but, in this instance, only the condenser C is connected in circuit and therefore less time is required to charge the condenser. Consequently, the tube $V_1$ is blocked in the manner above described after a shorter time interval than that obtaining during the "high" operation. Therefore, the heating unit 1 is flashed or overenergized for a relatively short period of time compared to the "flash to high" operation, and the heating unit is, therefore, heated rapidly to a relatively low temperature level. When the contactor 3 is deenergized by the blocking of tube $V_1$, the heating unit sections are connected in series across the low voltage supply conductors for normal low operation, as above described. When the switch 16 is thrown to its "off" position, the condenser C is discharged at a rate comparable to the rate of cooling of the heating unit from its low temperature.

It will be apparent that, if the switch 16 is thrown from its low position to its high position during the "flash to low" operation, the timing period will be extended to effect "flash to high" operation. If the switch is thrown from its low position to its high position during normal low operation, the inclusion of condenser $C_1$ in the circuit absorbs electrons from the grid of tube $V_1$, thereby unblocking the tube and causing energization of contactor 3. When the condensers C and $C_1$ have become charged, the grid of tube $V_1$ is again charged negatively so as to block the tube and deenergize the contactor 3 when the heating unit 1 has reached substantially its normal high temperature level.

If the switch 16 is thrown from its high position to its low position during "flash to high" operation, the flashing period will be shortened. If the switch is thrown from its high position to its low position during normal high operation of the heating unit, the tube $V_1$ will remain blocked and the contactor 3 will remain deenergized so that the heating unit 1 will cool from its high temperature level to its low temperature level.

In this device, the total charge of condensers C and $C_1$ is caused to substantially "track" with the temperature of the heating unit, as above described. In other words, the condensers are always "conditioned" in substantial accordance with the heating unit temperature, thus insuring proper flashing of the unit in any instance. Hence, the condensers not only time the flashing of the unit to different temperature levels but also time the flashing according to the temperature of the unit at the time of flashing thereof.

As is well known, the rate of cooling of a heated body, such as a heating unit, is not a linear function with time, but the temperature fall in degrees per unit of time will take the form of a curve whose slope is at first relatively steep and ultimately changes to zero slope when the object has cooled to the ambient temperature. Thus, if it be assumed that in ten minutes the heating unit will cool to a point where it may be safely reflashed for the same length of time as though it were actually at room temperature, and if this length of flash time is thirty seconds, it is found that after one minute's cooling from its normal high temperature, the unit may be safely reflashed for fifteen seconds; after two minutes' cooling it may be reflashed for twenty seconds; after about five minutes' cooling it may be reflashed for twenty-five seconds, and so on. Thus, to approach the maximum permissible flash available at all times, it is necessary to have a timer that will permit reflashing according to this non-uniform rate of cooling of the heating unit. The change in voltage in a condenser has been found to be a close approximation to the heating and cooling characteristics of a heating unit and is quite satisfactory, from a practical standpoint, for use as a timing element.

Thus, there is provided in Fig. 1, an electronic timer which controls the period of the flash operation initiated automatically by manipulation of the control switch 16. Obviously, this device prevents prolonged flashing of the heating unit and prevents the temperature of the heating unit from rising above its normal high temperature level. It is impossible, therefore, for the operator to damage the heating unit by over-flashing, whether it be intentional or unintentional. Furthermore, if the electronic timer should become inoperative, for example if one of the tubes or the transformer should burn out, the heating unit may be operated only in the normal manner and, if the flashing operation is in progress when the timer becomes defective or inoperative, the contactor 3 is automatically deenergized, thus interrupting the flashing operation. It will be seen, therefore, that the heating unit cannot be over-flashed by reason of any part of the apparatus becoming defective.

Figure 4:
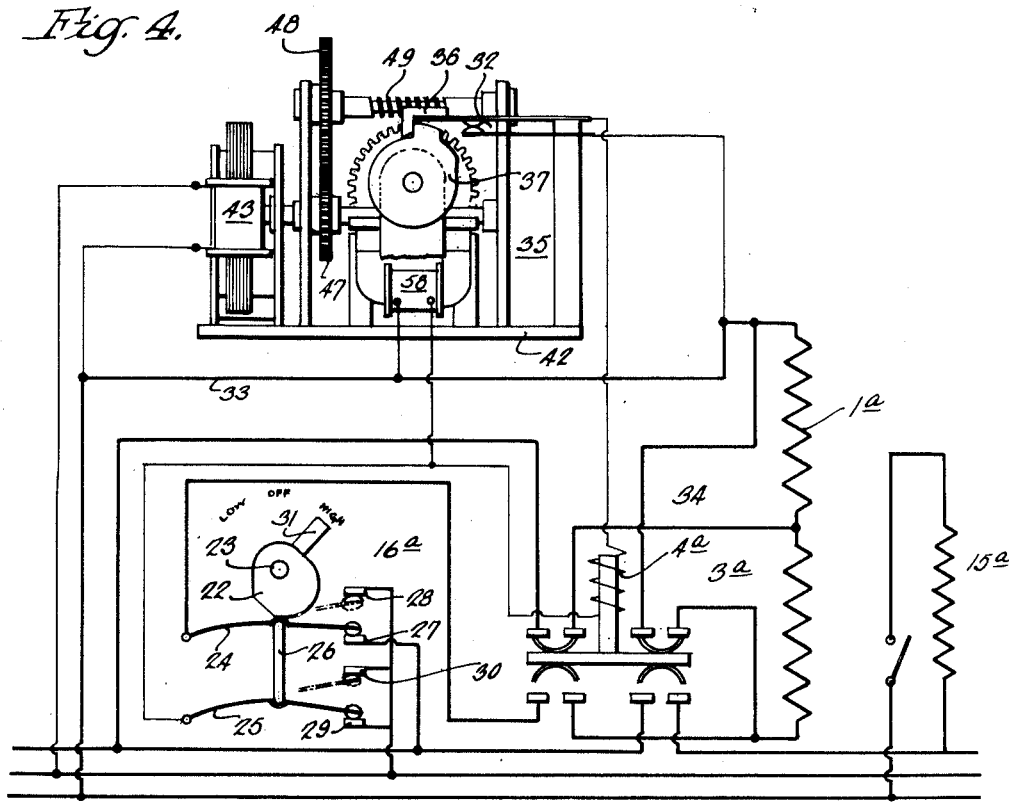
Fig. 4 is a diagrammatic illustration of another form of the invention.
Figure 5:
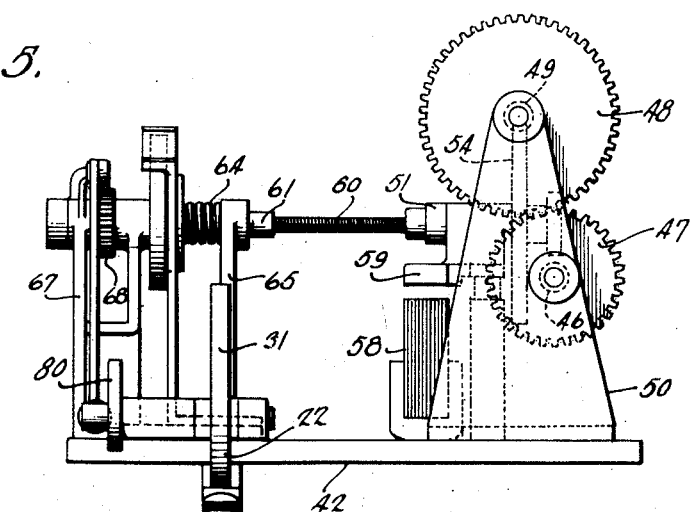
Fig. 5 is an elevational view of the timer of Fig. 4 looking at the same from the right of Fig. 4.

In Figs. 4 to 15, there is illustrated another form of the invention which employs a mechanical timer for controlling the duration of the flashing operation. Referring first to Fig. 4, the multi-section heating unit 1a is controlled by the contactor 3a which is similar to that of Fig. 1. A manually-operable control switch 16a varies the connections of the heating unit for low and high operation. This switch comprises a cam 22 mounted upon a rotatable shaft 23 and adapted to actuate the tandem switch blade structure comprising resilient contact arms 24 and 25 connected together mechanically by an insulating member 26. The contact end of the arm 24 is adapted to engage either of the contacts 27 and 28, while the contact end of arm 25 is adapted to engage either of the stationary contacts 29 and 30. The switch arms are mounted or arranged so that their resilience tends to carry them upward into engagement with the upper contacts 28 and 30 and the cam 22 acts against the resilience of the arms to move them either to the intermediate "off" position or to the lower contact position shown. An actuating knob 31, which may be formed integral with the cam 22, enables manual movement of the switch to the three positions indicated.

The energization of contactor 3a to move the armature thereof from normal position to the flash position shown is controlled by switch 32 in cooperation with the manual control switch 16a. The manner of operation of switch 32 will be described later. Assuming that this switch is closed, when the switch 16a is thrown to either of its effective positions, the contactor 3a is energized through a circuit extending from the intermediate supply conductor, the contact arm 25, the energizing coil 4a and the closed switch 32 back to the lowermost supply conductor. Thus, the contactor 3a is automatically moved to flash position whenever the control switch 16a is thrown to either its low or high position. In either case, the sections of heating unit 1a are connected in parallel relation across the high voltage supply conductors through a circuit which may be traced as follows: From the lowermost supply conductor over conductor 33, through parallel branch circuits, one including the upper section of unit 1a and the other including the lower section of the unit, and through the conductor 34 back to the uppermost supply conductor.

When the flash contactor returns to normal position at the end of the "flash to high" operation, the heating unit sections are connected in series across the high voltage supply conductors through arm 24 of switch 16a, while for low operation, the heating unit sections are connected in series relation between the intermediate supply conductor and the lowermost supply conductor. These circuits may be readily traced.

In this case also, the uppermost supply conductor is opened by contactor 3a during the flashing operation, thereby deenergizing or preventing energization of any subsequent load connected to the uppermost supply conductor as represented by the heating unit 15a. As stated above, this dropping of subsequent load during the flash operation is more fully disclosed and broadly claimed in the above-mentioned copending application.

The period during which the flash contactor 3a is energized for either "flash to low" or "flash to high" operation is controlled by the mechanical timer 35, the details of which are illustrated in Figs. 5 to 15. Referring particularly to Figs. 4, 9 and 10, the switch 32 comprises a pair of resilient contact arms whose resilience tends to maintain the contacts closed as illustrated, and on the extended end of the upper arm there is carried an L-shaped insulating piece 36 (Fig. 9), the depending portion of which forms a stop for the rotatable cam 37. This cam constitutes the timing element of the device and it controls the operation of switch 32. Before describing the details of the mechanism for operating cam 37, it is deemed advisable to explain briefly the cycle of operation. Normally, the cam is disposed as shown in Figs. 4 and 9 with its shoulder 38 abutting against the right side of the stop 36. By means of the mechanism described hereinafter, when the control switch 16a is thrown to its high position thereby initiating "flash to high" operation, as above described, the cam 37 is rotated clockwise, as viewed in Figs. 4 and 9, at a rate comparable to the rate of heating of unit 1a during flashing thereof. Accordingly, the shoulder 38 leaves stop 36 and the stop rides over the low portion 39 of the cam, the switch 32 remaining closed. At the end of a predetermined time interval, the cam follower portion of stop 36 rides up onto the high portion 40 of cam 37 thus opening switch 32, and the shoulder 41 abuts against the left side of the stop, thereby interrupting the rotation of the cam as shown in Fig. 10. The opening of switch 32 deenergizes contactor 3a, restoring the energization of heating unit 1a to normal. During the normal high operation of the heating unit 1a, the cam 37 remains in the position to which it has been moved, thus maintaining the switch 32 open. When the switch 16a is thrown to its "off" position to deenergize the heating unit, the cam is rotated counter-clockwise at a rate comparable to the cooling rate of the heating unit until the shoulder 38 abuts the right side of the stop with the cam in its normal position shown.

Thus, the operation of the cam comprises two cycles, one a timing cycle and the other a return cycle. Like the condensers C and $C_1$ of Fig. 1, the cam 37 is energized during the timing cycle at a rate comparable to the flash heating rate of the heating unit and during the return cycle, is operated at a rate comparable to the cooling rate of the heating unit. By properly relating the speeds of rotation of cam 37 to the heating and cooling rates of the heating unit, the cam is made to substantially "track" with the temperature of the heating unit and, under all conditions of operation, the amount of clockwise rotation of the cam will define a flash period sufficient to raise the temperature level of the heating unit substantially to the desired temperature level. Suppose, for example, that the flash were reinitiated during the cooling of the heating unit and while the cam 37 is rotating counter-clockwise in its return cycle. If the cam is substantially tracking with the heating unit temperature, the position of the cam in its return cycle at which the counter-clockwise rotation is interrupted and clockwise rotation is effected, will correspond to the instant temperature level of the heating unit, and the period required for the shoulder 41 to strike the stop 36 will be proper to raise the temperature of the heating unit from its instant level to its normal high temperature level.

The "flash to low" operation is similar to the "flash to high" operation except that when the switch 16a is thrown to the "low" position, the cam 37 is shifted clockwise by the means hereinafter described to reduce the amount of clockwise rotation necessary to open switch 32 and thus reduce the period of flash. Obviously, the reason for this is that less time is required to flash the heating unit to the low temperature level than is required to flash the unit to its high temperature level, it being remembered that the same operating voltage is applied to the unit in each case.

From the above discussion of the non-linear cooling characteristic of a heating unit, it will be apparent that in order to make the cam 37 "track" closely with the multi-heat unit at all times, it would be necessary to operate the cam 37 non-uniformly in accordance with the non-uniform cooling rate of the unit. While it is readily possible to obtain close "tracking" with a multi-heat unit employing condensers in an electronic timer, as in Fig. 1, the attainment of the same result in a mechanical timer necessitates complexity of design. If the cam 37 is operated at a uniform rate, that is if its movement is a linear function, accurate control of the flashing of the heating unit may be obtained as long as the heating unit is flashed to either its low or high temperature from substantially room temperature; but if the heating unit is flashed from some partly cooled condition the flash period may not be sufficiently long to flash the unit to the desired temperature, because the cam 37 will not have moved as fast as the heating unit cooled during the first part of the cooling cycle. In any such case, however, the heating unit will be flashed almost to the desired temperature, and therefore this shortcoming hardly warrants the complexity of design required to operate cam 37 at a non-uniform rate.

Considering now the mechanical structure illustrated by means of which the cam 37 is operated, the complete timer may be constructed as a unit with the constituent parts thereof mounted upon a common base or support 42. A small motor 43 is energized continuously, as may be seen from Fig. 4. This motor runs at a uniform speed and functions through the reduction gearing 44 (Fig. 6) to drive a shaft 45 on which there is provided a gear worm 46. On the shaft 45, there is provided a gear 47 (see Figs. 5 and 15) which meshes with a gear 48 on a worm shaft 49 which is spaced from the worm shaft 45. The two worm shafts are suitably journaled in bearing standards carried by the mounting bracket 50 (see Fig. 15). It will be seen that the two worm shafts are caused to operate in opposite directions. A vertically shiftable casting 51 (Fig. 14) rotatably carries a stud or shaft 52 on which there is mounted a small pinion 53 and a relatively large gear 54. The casting 51 carries extending pins or plungers 55 (Fig. 14) which are slidably seated in cylindrical guides 56 and are urged upward by springs 57. Thus, the stud-carrying casting 51 is supported for vertical movement and is urged upward by the springs 57. The pinion 53 is adapted to mesh with the worm 46, while the gear 54 is adapted to mesh with the worm 49. Normally, the springs 57 cause meshing of gear 54 with worm 49, raising the pinion 53 out of mesh with the worm 46, but when the casting 51 is moved downward against the action of the springs, the gear 54 is moved out of mesh with worm 49 and the pinion 53 is meshed with the worm 46, as shown in Figs. 14 and 15. In this manner, the shaft 52 is driven in opposite directions at predetermined rates of speed.

In order to shift the casting 51 downward against the action of its springs, there is provided an electromagnet 58, and a portion of the casting 51 is formed to provide an armature 59 which is attracted by the magnet when the latter is energized. It will be seen from Fig. 4 that the electromagnet 58 is energized whenever the switch 16a is actuated, and thus the worm 46 drives the stud 52 through pinion 53 during the timing cycle above mentioned. When switch 16a is thrown to its "off" position, however, the electromagnet 58 is deenergized, and the stud 52 is driven in the opposite direction by worm 49 through gear 54 during the return cycle above mentioned.

A flexible shaft 60 is connected to stud 52 and the opposite end of the flexible shaft is connected to a stud or shaft 61, on the end of which there are carried frictional clutch plates 62 and 63 held in frictional engagement with a face of cam 37 by means of spring 64 (see Fig. 8). The stud or shaft 61 is journaled in the upright 65 which also serves as a stop for the spring 64. The cam 37 is mounted upon the shaft 66. It will now be seen that the rotation of stud 52 in opposite directions, as above described, effects rotation of cam 37 in opposite directions, thus operating the cam through its timing and return cycles. The shaft 66 is rotatably supported by the journal support or upright 67.

The purpose of the clutch 62, 63 is to permit the cam 37 to stop rotating while the driving mechanism therefor continues to operate. It will be recalled from the above description that when the shoulder 41 of cam 37 abuts against the stop 36 at the end of the timing cycle, the clockwise rotation of the cam is stopped. The ability of the clutch 62, 63 to slip permits the cam to remain stationary in the position of Fig. 10 while the driving mechanism continues to operate. The same applies to the stoppage of the counter-clockwise rotation of the cam when it is returned to its normal position shown in Figs. 4 and 9. It will be understood, of course, that any suitable mechanism other than a slipping clutch may be employed for the purpose.

In order to shift the cam 37 when "flash to low" operation is initiated, as above mentioned, there is provided on shaft 66 a pinion 68 and adjacent the pinion there is provided a rack bar 69, one end of which carries a roller 70 arranged to ride in the guide cam 71 (see Figs. 7, 11 and 13), while the opposite end of bar 69 is pivoted at 72 to a lever 73. The cam 71 is adjustably carried by support 67 and has a guide plate 71a which, together with bearing 67a, prevents lateral movement of the rack bar (Figs. 7 and 8). The lever 73 is pivoted at 74 and is connected by a pin and slot connection 75 to a link 76 (Fig. 12) which, in turn, is pivotally connected to a reciprocable rod 77 mounted in support 78. The opposite end of rod 77 carries a cam follower or roller 79 which engages a cam 80 mounted on the shaft 23 of switch 16a. The shaft 23 is rotatably supported by bracket 81 (Fig. 6). A spring 82 surrounds link 76 between lever 73 and pin 83, as illustrated in Figs. 7 and 13, to normally take up the lost-motion of the pin and slot connection 75. A spring 84 maintains the cam follower 79 in engagement with the cam 80.

When the switch 16a is in either its "off" position or its "high" position, the mechanism just described remains in its inoperative position shown in Fig. 7, the rack bar 69 being out of engagement with pinion 68. When the switch 16a is thrown to its "low" position, however, the cam 80 moves rod 77 toward the left, as viewed in Figs. 7 and 13, thereby rotating lever 73 clockwise and moving the rack bar 69 toward the right. This linkage movement is permitted by the link 76 and the pin and slot connection 75. As the rack bar 69 is shifted toward the right, its cam follower 70 rides down into the recess of the guide cam 71, as shown in broken line illustration in Fig. 13, so that the rack bar 69 is meshed with pinion 68 and racks the pinion clockwise, thereby shifting cam 37 clockwise a predetermined amount. As mentioned above, this shortens or reduces the time period for the "flash to low" operation. It will be noted that the spring 85 insures that the cam follower 70 will drop into the recessed guide cam 71. At the end of its stroke, the rack bar 69 moves out of engagement with pinion 68, the cam follower 70 moving up onto the right hand portion of cam 71, as shown in full lines in Fig. 13. When the switch 16a is again thrown to its "off" position, the pinion 68 is racked in the opposite direction, as will be clearly seen from the foregoing description. This shortens the return travel of the cam 37 commensurate with the time required for the heating unit to cool from its low level.

To recapitulate, whenever the control switch 16a is thrown from its "off" position to either of its two effective positions, the contactor 3a is energized to initially connect the heating unit sections in parallel across the high voltage conductors, the energizing circuit for the contactor being completed through switch 32. At the same time, the electromagnet 58 is energized through switch 16a, moving the gear 54 out of mesh with worm 49 and causing the pinion 53 to mesh with worm 46. As a result, the continuously operating motor 43 drives the cam 37 clockwise through its timing cycle from its normal initial position shown in Figs. 4 and 9, the driving being effected through the various gears and the flexible shaft 60. If the switch 16a has been thrown to its "low" position, the cam 37 will be racked by the rack bar 69 a predetermined angular amount as above described. When the cam 37 reaches the limit of its clockwise travel, the switch 32 is opened, thereby deenergizing the contactor 3a and interrupting the flash operation. The heating unit is then operated normally at the selected temperature level. The ability of clutch 62, 63 to slip enables the cam 37 to remain stationary while the driving mechanism continues to operate. The pinion 53 is maintained in mesh with worm 46 since the electromagnet 58 remains energized as long as the switch 16a is closed.

When switch 16a is opened, that is turned to "off" position, the electromagnet 58 is deenergized, thus permitting the springs 57 to move pinion 53 out of mesh with worm 46 and to move gear 54 into mesh with worm 49. The cam 37 is then very slowly rotated counter-clockwise back to its normal position shown in Figs. 4 and 9. As mentioned above, this return movement of the cam is the return cycle during which the heating unit 1a is cooling.

It will be seen that if the heating unit has been flashed to its high temperature level, the cam 37 having rotated clockwise to the limit of its timing cycle travel, the heating unit cannot be reflashed by changing the position of switch 16a since the switch 32 remains open. At such time, if the switch 16a is thrown from its "high" position to its "low" position, the rack bar 69 will attempt to rack the pinion 68 but, obviously, the pinion can rotate no furher. The lost-motion connection comprising the pin and slot connection 75 and the spring 82 takes up the movement of rod 77 which would otherwise be imparted to the rack bar.

If the heating unit has been flashed to its low temperature level, the cam 37 having been racked clockwise, and if the switch 16a is then thrown to its "high" position, the cam will be racked counter-clockwise from the position of Fig. 10. If the raised portion 40 of the cam is such that this racking of the cam permits reclosing of switch 32, the heating unit will be reflashed for a short period. But if the portion 40 does not permit reclosing of the switch 32, the unit will not be reflashed but will heat normally from low to high.

After "flash to low" has been initiated, if the switch 16a is thrown to the "high" position during the "flash to low" operation, the period of the flashing operation will be extended, since cam 37 will be racked by the rack and pinion as above described and, therefore, the heating unit will be flashed to the high temperature level.

During the "flash to high" operation, if the switch 16a is thrown to its "low" position, the cam 37 will be racked by the rack and pinion to decrease the flash period and to flash the heating unit to "low" rather than "high" unless the cam 37 is so far advanced in its travel that the "flash to high" has almost been completed.

As pointed out above, the rates of travel of the cam 37 during the timing and return cycles should be related respectively to the flash heating rate and the cooling rate, respectively, of the unit 1a, so that the cam 37 substantially "tracks" with the temperature of the heating unit. Of course, this is a matter of design which involves making the driving mechanism for cam 37 conform to the heating and cooling rates of the heating unit. Further, the design will vary with different types of heating units. In any case, the timing mechanism may be designed in a simple manner by first determining the time required to flash the heating unit from the cold condition to its normal high temperature and the time required for the heating unit to cool from such temperature to cold condition, and then the driving mechanism may be properly designed so that the clockwise rotation of cam 37 required to open switch 32 conforms substantially to the time required to flash the heating unit, and the counter-clockwise rotation of cam 37 between its limits of travel conforms to the time required for the heating unit to cool.

Since the cam 37 substantially "tracks" with the temperature of the heating unit, it will be apparent that the flashing of the heating unit from some partially heated condition to a higher temperature will be governed by the instant position of the cam. For example, if the cam is in its return cycle, the heating unit will be partially heated and, if operation is initiated, the timing cycle of the cam, and consequently the flash period, will be shorter than would be the case if the flash were initiated from the cold condition. Thus, in any instance, the flash period is of proper duration to raise the temperature level of the heating unit substantially to that desired and no higher. Of course, as pointed out above, the non-uniformity of cooling of the heating unit will cause a reflashing of the unit to be of slightly less duration than is required to raise the unit exactly to the desired temperature, where the cam movement is at a uniform rate as disclosed, but this hardly warrants the complexity of design that would be required to impart non-uniform movement to the cam.

From the above description, it will be seen that the invention provides a novel flashing control mechanism comprising a timer which may take different forms, the electronic and mechanical timers illustrated being merely examples of possible forms of the invention. It will be understood, therefore, that further embodiments or modifications may be employed within the scope of the invention. Broadly speaking, the invention contemplates the provision of means for flashing an electric heating unit to different temperature levels and timing means for controlling the flashing period according to the temperature level selected and also according to the instant temperature of the heating unit.

I claim:

1. In an electrical cooking apparatus, an electrical heating unit, means for energizing said unit, manual means for operating said unit at a selected one of a plurality of temperature levels, means for increasing the energization of said unit to above normal, to cause said unit to heat rapidly, means including at least one timing element for controlling the period of abnormal energization of said unit, means responsive to actuation of said manual means for conditioning said timing element in correspondence to the selected temperature level, thereby adapting said timing element to control the period of abnormal energization in accordance with the selected temperature level, means for energizing said timing element through a timing cycle at a rate comparable to the rate of heating of the abnormally energized unit, and means for operating said timing element through a return cycle when said unit is deenergized, at a rate comparable to the cooling rate of said unit.

2. In an electrical cooking apparatus, an electrical heating unit, means including a multi-position switch for variously energizing said unit to operate the same at different temperature levels, means operable by said switch for initially increasing the energization of said unit to above normal, to cause said unit to heat rapidly, timing means for controlling the period of abnormal energization of said unit, and means responsive to actuation of said switch for conditioning said timing means in correspondence to the selected temperature level, whereby said timing means controls the period of abnormal energization in accordance with the selected temperature level.

3. In an electrical cooking apparatus, an electrical heating unit, means including a multi-position switch for applying different operating voltages to said unit to operate the same at different temperature levels, means operable by said switch for initially increasing the energization of said unit to above normal, to cause said unit to heat rapidly, timing means for controlling the period of abnormal energization of said unit, and means responsive to actuation of said switch for conditioning said timing means in correspondence to the selected temperature level, whereby said timing means controls the period of abnormal energization in accordance with the selected temperature level.

4. In an electrical cooking apparatus, an electrical heating unit, means for energizing said unit, means for increasing the energization of said unit to above normal, to cause said unit to heat rapidly, electrical timing means including at least one condenser for controlling the period of abnormal energization of said unit, means for charging said condenser at a rate comparable to the rate of heating of the abnormally energized unit, to thereby time the period of abnormal energization of the unit, and means for discharging said condenser when said unit is deenergized, at a rate comparable to the cooling rate of said unit, whereby said condenser tracks with said unit during both heating and cooling.

5. In an electrical cooking apparatus, an electrical heating unit, means for energizing said unit, means for increasing the energization of said unit to above normal, to cause said unit to heat rapidly, means including a rotatable timing member for controlling the period of abnormal energization of said unit, means for operating said timing member through a timing cycle at a rate comparable to the rate of heating of the abnormally energized unit, and means for operating said timing member through a return cycle when said unit is deenergized, at a rate comparable to the cooling rate of said unit.

6. In an electrical cooking apparatus, an electrical heating unit, means for energizing said unit, means for increasing the energization of said unit to above normal, to cause said unit to heat rapidly, means including a switch for controlling the period of abnormal energization of said unit, a timing cam for actuating said switch, means for actuating said cam through a timing cycle at a rate comparable to the rate of heating of the abnormally energized unit, and means for actuating said cam through a return cycle when said unit is deenergized, at a rate comparable to the cooling rate of said unit.

7. In an electrical cooking apparatus, an electrical heating unit, means for energizing said unit, electrically-operable switching means for varying the connections of said unit to increase the energization thereof to above normal, to thereby cause said unit to heat rapidly, a manually-operable multi-position switch for controlling the normal operating temperature level of said unit and for energizing said switching means, a switch for controlling the energization of said switching means, a cam for actuating said last-mentioned switch, means for rotating said cam through a timing cycle to thereby control the period of abnormal energization of said heating unit, and means for returning said cam to normal position after said manual switch is moved to off position.

8. In an electrical cooking apparatus, an electrical heating unit, means for energizing said unit, means including a multi-position switch for operating said unit at different temperature levels, means operable by said switch for initially increasing the energization of said unit to above normal, to cause said unit to heat rapidly, means including a timing element for controlling the period of abnormal energization of said unit, means for energizing said timing element through a timing cycle at a rate comparable to the rate of heating of the abnormally energized unit, means for operating said timing element through a return cycle when said unit is deenergized, at a rate comparable to the cooling rate of said unit, and means operable by said switch for conditioning said timing means so as to vary the time duration of said timing cycle according to the temperature level selected by said switch, to thereby effect rapid heating of said unit to the selected temperature.

9. In an electrical cooking apparatus, an electrical heating unit, means for energizing said unit, means including a multi-position switch for operating said unit at different temperature levels, means operable by said switch for initially increasing the energization of said unit to above normal, to cause said unit to heat rapidly, electrical timing means including at least one condenser for controlling the period of abnormal energization of said unit, means for charging said condenser at a rate comparable to the rate of heating of the abnormally energized unit, to thereby time the period of abnormal energization of the unit, means for discharging said condenser when said unit is deenergized, at a rate comparable to the cooling rate of said unit, and means for varying the time duration of the timing cycle according to the temperature level selected by said switch.

10. In an electrical cooking apparatus, an electrical heating unit, means for energizing said unit, means including a multi-position switch for operating said unit at different temperature levels, means operable by said switch for initially increasing the energization of said unit to above normal, to cause said unit to heat rapidly, electrical timing means including a plurality of condensers for controlling the period of abnormal energization of said unit, means on said switch for rendering one or more of said condensers effective in dependence upon the temperature level selected by said switch, means for charging each effective condenser at a rate comparable to the rate of heating of the abnormally energized unit, to thereby time the period of abnormal energization of the unit, and means for discharging each charged condenser when said unit is deenergized, at a rate comparable to the cooling rate of said unit.

11. In an electrical cooking apparatus, an electrical heating unit, means for energizing said unit, means including a multi-position switch for operating said unit at different temperature levels, means operable by said switch for initially increasing the energization of said unit to above normal, to cause said unit to heat rapidly, means including a movable timing element for controlling the period of abnormal energization of said unit, means for actuating said timing element through a timing cycle at a rate comparable to the rate of heating of the abnormally energized unit, means for actuating said timing element through a return cycle when said unit is deenergized, at a rate comparable to the cooling rate of said unit, and means operable by said switch for conditioning said timing element so as to vary the time duration of said timing cycle according to the temperature level selected by said switch, to thereby effect rapid heating of said unit to the selected temperature.

12. In an electrical cooking apparatus, an electrical cooking unit, means for supplying predetermined energizing current to said unit to effect normal energization thereof, means for greatly increasing the energizing current to said unit to effect rapid heating thereof, electrical timing means including at least one condenser operable through charge and discharge cycles, manually-controllable means for actuating said current-increasing means and for simultaneously initiating operation of said timing means, means for charging said condenser through a timing cycle at a rate such that it attains a substantially fully-charged condition at substantially the same time that the overenergized unit reaches a predetermined temperature level, means for automatically interrupting the increased energizing current to said unit when said condenser attains said charged condition, and means responsive to deenergization of said unit for discharging said condenser through a return cycle at a rate such that it attains a substantially fully discharged condition at substantially the same time that the deenergized unit reaches a temperature from which the full rapid heating operation may be repeated safely, whereby said condenser is caused to substantially track with said unit during both heating and cooling of the unit.

13. In an electrical cooking apparatus, an electrical cooking unit, means for supplying predetermined energizing current to said unit to effect normal energization thereof, means for greatly increasing the energizing current to said unit to effect rapid heating thereof, a rotary timing element operable through timing and return cycles, manually-controllable means for actuating said current-increasing means and for simultaneously initiating operation of said timing element, means for operating said timing element through its timing cycle at a rate such that it finishes its timing cycle at substantially the same time that the overenergized unit reaches a predetermined temperature level, means actuated by said timing element at the end of its timing cycle for interrupting the increased energizing current to said unit, and means responsive to deenergization of said unit for operating said timing element through its return cycle at a rate such that it finishes its return cycle at substantially the same time that the deenergized unit reaches a temperature from which the full rapid heating operation may be repeated safely, whereby said timing element is caused to substantially track with said unit during both heating and cooling of the unit.

14. In an electrical cooking apparatus, an electrical cooking unit, manually-adjustable means for operating said unit at different temperature levels, means for greatly increasing the energizing current to said unit to effect rapid heating thereof, at least one timing element operable through timing and return cycles, means responsive to temperature-increasing adjustment of said manual means for actuating said energy-increasing means and for initiating operation of said timing element, means operable by said manual means for conditioning said timing element in correspondence to the selected temperature level, means for operating said timing element through its timing cycle at a rate such that it finishes its timing cycle at substantially the same time that the abnormally energized unit reaches the selected temperature level, means for automatically interrupting the abnormal energization of said unit when said timing element finishes its timing cycle, and means responsive to deenergization of said unit for operating said timing element through its return cycle at a rate such that it finishes its return cycle at substantially the same time that the deenergized unit reaches a temperature from which the full rapid heating operation may be repeated safely, whereby said timing element is caused to substantially track with said unit during both heating and cooling of the unit.

15. In an electrical cooking apparatus, an electrical heating unit, means for energizing said unit, means for increasing the energization of said unit to above normal, to cause said unit to heat rapidly, a rotatable timing member arranged to travel through a predetermined range of angular movement, means for moving said member through its range of movement at a rate such that it reaches the end of said range at substantially the same time that the abnormally energized unit reaches a predetermined temperature level, means actuated by said member at the end of its travel for interrupting the abnormal energization of said unit, and means responsive to deenergization of said unit for moving said member in a reverse direction at a rate such that it reaches the opposite end of its range at substantially the same time that the deenergized unit reaches a temperature from which the full rapid heating operation may be repeated safely, whereby said member is caused to substantially track with said unit during both heating and cooling of the unit.

16. In an electrical cooking apparatus, an electrical cooking unit, at least one other electric cooking unit, means for supplying predetermined energizing current to either one or both of said units to effect normal energization of the same, a mechanism for greatly increasing the energizing current to said first unit and for preventing energization of said other unit during the increased energization of the first unit, at least one timing element operable through timing and return cycles, manually-controllable means for actuating said mechanism and for simultaneously initiating operation of said timing element, means for operating said timing element through its timing cycle at a rate such that it finishes its timing cycle at substantially the same time that said first unit reaches a predetermined temperature level, means for automatically effecting return operation of said mechanism when the timing element finishes its timing cycle, whereby the energization of said first unit is reduced to normal and the energization of said other unit is permitted and means responsive to deenergization of said first unit for operating said timing element through its return cycle at a rate such that it finishes its return cycle at substantially the same time that the deenergized first unit reaches a temperature from which the full rapid heating operation may be repeated safely, whereby said timing element is caused to substantially track with said first unit during both heating and cooling of such unit.

JOSEPH W. MYERS.